United States Patent
Krieger et al.

(10) Patent No.: US 8,699,502 B2
(45) Date of Patent: Apr. 15, 2014

(54) MEDIA RECEIVER HUB

(75) Inventors: Abraham Krieger, San Diego, CA (US); Laurence Alan Strong, Bristol (GB); Mats Lindstrom, San Diego, CA (US); Sadashiv Vinayak Phadnis, San Diego, CA (US); Yoav P. Goldenberg, Kiryat Byalik (IL)

(73) Assignee: Entropic Communications, Inc., San Diego, CA (US)

( * ) Notice: Subject to any disclaimer, the term of this patent is extended or adjusted under 35 U.S.C. 154(b) by 1000 days.

(21) Appl. No.: 12/405,006

(22) Filed: Mar. 16, 2009

(65) Prior Publication Data

US 2009/0232077 A1    Sep. 17, 2009

Related U.S. Application Data

(60) Provisional application No. 61/036,935, filed on Mar. 15, 2008.

(51) Int. Cl.
  *H04L 12/28*    (2006.01)
  *H04N 7/18*    (2006.01)
  *H04N 7/173*    (2011.01)
  *H04N 7/16*    (2011.01)

(52) U.S. Cl.
  USPC ............. 370/401; 370/420; 370/422; 725/71; 725/78; 725/95; 725/120; 725/139

(58) Field of Classification Search
  USPC ......... 370/277–278, 282, 389, 392, 401, 420, 370/422, 485; 725/64, 68, 71, 74, 78, 95, 725/120, 139
  See application file for complete search history.

(56) References Cited

U.S. PATENT DOCUMENTS

| | | | |
|---|---|---|---|
| 2004/0125779 A1* | 7/2004 | Kelton et al. | 370/338 |
| 2004/0172658 A1* | 9/2004 | Rakib et al. | 725/120 |
| 2005/0289623 A1* | 12/2005 | Midani et al. | 725/100 |
| 2006/0031888 A1* | 2/2006 | Sparrell | 725/78 |
| 2006/0225102 A1* | 10/2006 | James et al. | 725/68 |

* cited by examiner

*Primary Examiner* — Redentor Pasia
(74) *Attorney, Agent, or Firm* — Richard Bachand; Duane Morris LLP

(57) ABSTRACT

A media receiver hub receives wireless signals from multiple sources (e.g., satellite signals from multiple satellites) and provides the signals to end devices over a local network. According to an example embodiment, a satellite hub is responsive to channel input selections received from end devices by selecting channels from within received satellite signals, and by converting each channel into a format amenable for delivery to and use at an end device requesting the channel. The converted channels are communicated to the end devices over a network that also facilitates communications between the devices, by restricting the communications to using a portion of the available bandwidth of the network, reserving bandwidth for communications with and/or between the end devices (or other network devices).

7 Claims, 9 Drawing Sheets

MEDIA RECEIVER HUB

RELATED PATENT DOCUMENTS

This patent document claims the benefit, under 35 U.S.C. §119(e), of U.S. Provisional Patent Application Ser. No. 61/036,935 filed on Mar. 15, 2008 and entitled "Central Satellite Receiver Hub"; this patent document and the Appendices filed therewith (and forming part of the document) are fully incorporated herein by reference.

FIELD

The present invention relates generally to the processing and delivery of signals, and to systems and methods for receiving, processing and delivering satellite media.

BACKGROUND

The receipt, processing and delivery of wireless media, such as satellite-based video media, has become increasingly challenging as the amount of data to be delivered increases. In addition, prior approaches to the reception and delivery of such media for playback at one or more locations have often required complex wiring, which can be difficult or impossible to implement in desired locations.

For example, as direct broadcast satellite operators move from standard definition (SD) to high definition (HD), more transmission bandwidth is needed for HD transmissions. Generally, the increased transmission bandwidth needed for receiving HD transmissions from satellites is provided by transponders distributed over multiple satellites. This requires aggregation of the signals from multiple satellites, and delivery of the signals to end devices such as set-top boxes or other devices that can extract video data from an appropriate channel for playback.

Previous approaches to delivering satellite media data to end devices have also generally required a dedicated communications link, such as a radio frequency (RF) coaxial cable. In addition, these approaches have been limited in the number of channels or feeds that can be provided to respective end devices.

In addition to the above matters, it is often desirable to store received media data, such as might correspond to a television program, live sporting event or movie. However, the storage and playback of media data has been generally limited to specific devices to which the media has been delivered (e.g., digital video recorders integrated with set-top boxes). Moreover, the management and control of stored media and its playback has also been similarly limited to that which occurs at a particular device.

These and other issues remain challenging to data communications, and in particular to the fast and simple communication of data such as multimedia data

SUMMARY

Various aspects of the present invention are directed to methods and systems for processing and delivering media data in a manner that addresses challenges including those discussed above.

Example embodiments of the present invention are directed to a satellite receiver system that aggregates satellite signals and selects a subset of the signals (e.g., for specific channels) according to an end-user's instructions. Each channel in the selected subset is processed into a format to make it suitable for communication to and use at an end device, based upon the end-user's instructions Another example embodiment is directed to a satellite receiver hub having a channel selection module and a communications circuit. The channel selection module is configured to receive and aggregate signals from multiple satellites, and to select a subset of channels from the aggregated signals in response to user-inputs identifying selected channels specified for respective end devices. The communications circuit is configured, for each channel in the subset of channels, to convert the channel into a device-specific data stream for communication to a specified end device on a local network over which the end devices communicate, reserving bandwidth on the local network to permit communications between the end devices.

Other embodiments are directed to network-based systems, including such a hub as described above, a network and a plurality of end devices that receive one or more channels from the hub for playback, and that communicate with one another over the network. Bandwidth on the network is reserved for such end-device communications and/or other networking, such as used in an Ethernet environment and Internet-based communications.

The above summary is not intended to describe each embodiment or every implementation of the present disclosure. The figures and detailed description that follow more particularly exemplify various embodiments.

BRIEF DESCRIPTION OF THE DRAWINGS

The invention may be more completely understood in consideration of the following detailed description of various embodiments of the invention in connection with the accompanying drawings, in which.

Figure 1:
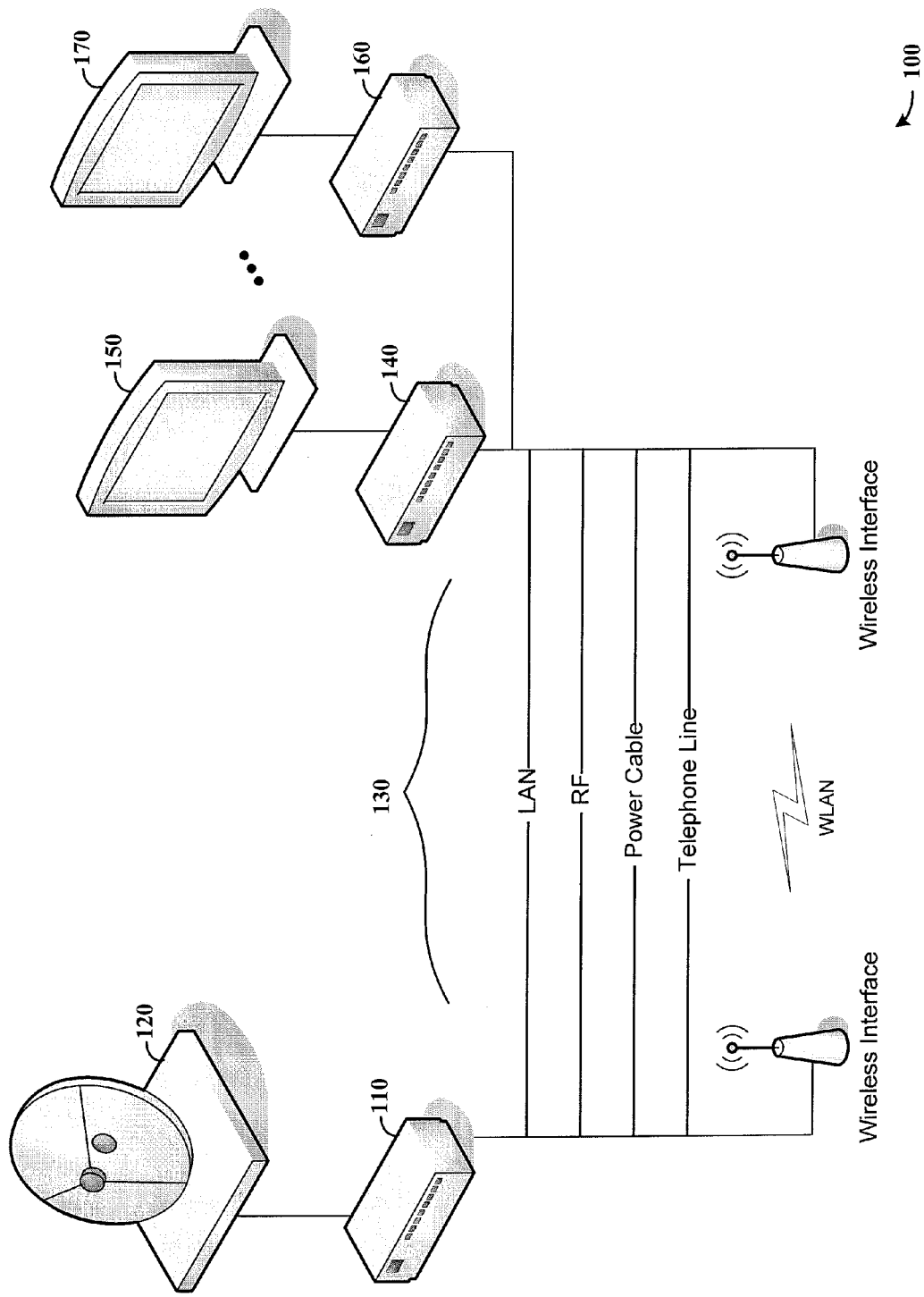
FIG. 1 shows a system and approach for communicating satellite data between devices, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention including aspects defined in the claims.

DETAILED DESCRIPTION

The present invention relates to systems and methods for processing and communicating media, and in particular, to processing wireless signals such as those received from a satellite for use in media playback. While the present invention is not necessarily limited to such approaches, various aspects of the invention may be appreciated through a discussion of examples using these and other contexts.

According to an example embodiment, a media receiver hub receives satellite signals bearing multiple media channels and selectively presents media channels to local end devices that use the media, in response to channel selections received from each end device. The hub extracts one or more of the media channels and communicates the extracted media channel(s) over a local network to the respective playback devices requesting the channel. The hub communicates the channels in a manner that reserves or otherwise provides bandwidth on the local network to permit packet-based communications between devices on the network.

The hub communicates over the local network to permit a variety of packet-based communications between devices on the network, to suit various applications. For instance, the packet-based communications may involve communications between the respective media playback devices (e.g., for requesting and delivering stored media), communications between the playback devices and the hub (e.g., for making channel selections), or communications between other packet-based devices such as computers, hand-held devices and others. In this manner, a single network can be implemented for wireless media signal communications, such as those received for satellite-based media (e.g., television, audio or pay-per-view events), as well as packet-based communications as implemented for local network such as used for home computers and other devices.

In some applications, the local network includes a radio frequency (RF) network as may be used in connecting a satellite antenna (e.g., dish) with an end device that uses media provided via the antenna for playback. The hub frequency translates selected channels and communicates the frequency-translated signals to end devices per the requests. The hub uses a reduced range of the total bandwidth available for communicating on the RF network, reserving an additional portion of the available bandwidth for other communications, such as for communicating between a STB and the hub, between STBs, or for use as a local area network (LAN) and as further applicable for connecting to the Internet. In short, the hub frequency translates the channels to a communication frequency within the reduced-bandwidth range, and limits the communication of the satellite media to the reduced-bandwidth range. This approach further permits the request and delivery of stored media content between the end devices, such as for delivering media for a recorded program received via satellite. This is useful, for example, to permit viewing of the recorded program at any connected playback device, making it possible to view recorded media content at any playback device so connected.

In other applications, the local network includes a packet-based network such as a wired and/or wireless local area network LAN, which implements packet-based addressing for sending and receiving packets of data (e.g., using a Category 5e wire as defined by the Telecommunications Industry Association, or communicating wirelessly using the IEEE 802.11 series of standards). The hub configures received media into packets in response to channel selections received from end devices, and includes an address in each packet to identify the end device to which the packet is to be delivered. The hub communicates the configured packets to the respective end devices over the local network, with additional bandwidth in the network used for other packet-based communications that may include, for example, control communications for requesting channels and/or stored media. In addition, the respective end devices may communicate with one another over the packet-based network as discussed above.

Some embodiments involve using two or more networks, such as both an RF-type network and a packet-based network. The hub frequency translates channels for communication on the RF-type network and/or configures the channels for communication on the packet-based network according to the configuration of the end devices or other control characteristics. Such an approach may be applicable to environments bearing both RF connections and packet-based network connections respectively using, for example, coaxial cable and either wireless or wired Ethernet connections.

Where a particular end device is connected to the hub via two or more networks, the hub may use either network to communicate media content to the end device and/or to otherwise communicate with the end device. For instance, if multiple end devices are connected to the hub via coaxial cable for RF-type communications on an RF network and the available bandwidth on the RF network has been used, the hub may use packet-based communications to communicate media content to those end devices connected to the hub over a separate packet-based network, in order to reserve bandwidth on the RF network.

Turning now to the figures, FIG. 1 shows a system 100 and related approach for communicating satellite data between devices, according to an example embodiment of the present invention. A receiver hub 110 is connected to a satellite antenna 120 for receiving satellite-based media streams, and to a plurality of end units 140-160 over one or more networks 130. The end units 140 and 160 are respectively coupled to displays 150 and 170 for displaying video (and, where appropriate, accompanying audio) as received via the satellite antenna 120. While FIG. 1 shows two end units (140, 160) and exemplary networks (LAN, RF cable, power cable, telephone line and wireless LAN (WLAN)), a multitude of end units and network types may be implemented in connection with the system 100.

In response to channel selections received for a particular one of the end units, the receiver hub 110 selects a channel from received satellite data and configures the selected channel for transmission over one of the networks 130 according to characteristics of the end unit requesting the channel, and further in accordance with the type of network over which communications are sent. For instance, where the end unit 140 is connected via an RF cable for receiving frequency-based transmissions, the receiver hub 110 processes the received satellite data (i.e., transport stream) to a frequency assigned to the end unit 140 and within a predetermined frequency range within the bandwidth of the RF cable. Where end unit 160 is connected via one of the packet-based networks (e.g., the WLAN), the receiver hub 110 processed the receive satellite data by coding the data into a packet-based stream, with the packets including data that identifies the end unit 160 as the recipient of the packetized data.

The receiver hub 110 thus receives satellite signals, and for one or more channels in the signal (i.e., with a channel corresponding to a broadcast channel such as a television channel), configures the channel according to the type of end device that will use the channel and further in accordance with a network over which the channel is to be sent. For instance, the hub 110 can perform signal down-conversion, demodulation, error correction (if appropriate), packet ID (PID) filtering and transport stream re-multiplexing to deliver selected channels on an incoming transport stream to different end devices. In some applications, the re-multiplexed transport streams are packetized in internet protocol (IP) packets to be transported to an end device, using a TCP/IP protocol. A common media access control and physical layer approach can be used to transfer streams from the hub 110 to the end devices, and between end devices on the network. Furthermore, where installing new physical cable is undesirable, the hub 110 may communicate with end device using wireless communications and/or power line communications that use existing power lines within a residence. For general information regarding power line communications, and for specific information regarding power line communications that may be implemented in connection with one or more example embodiments, reference may be made to U.S. Pat. No. 6,741,162, which is fully incorporated herein by reference.

Figure 2:
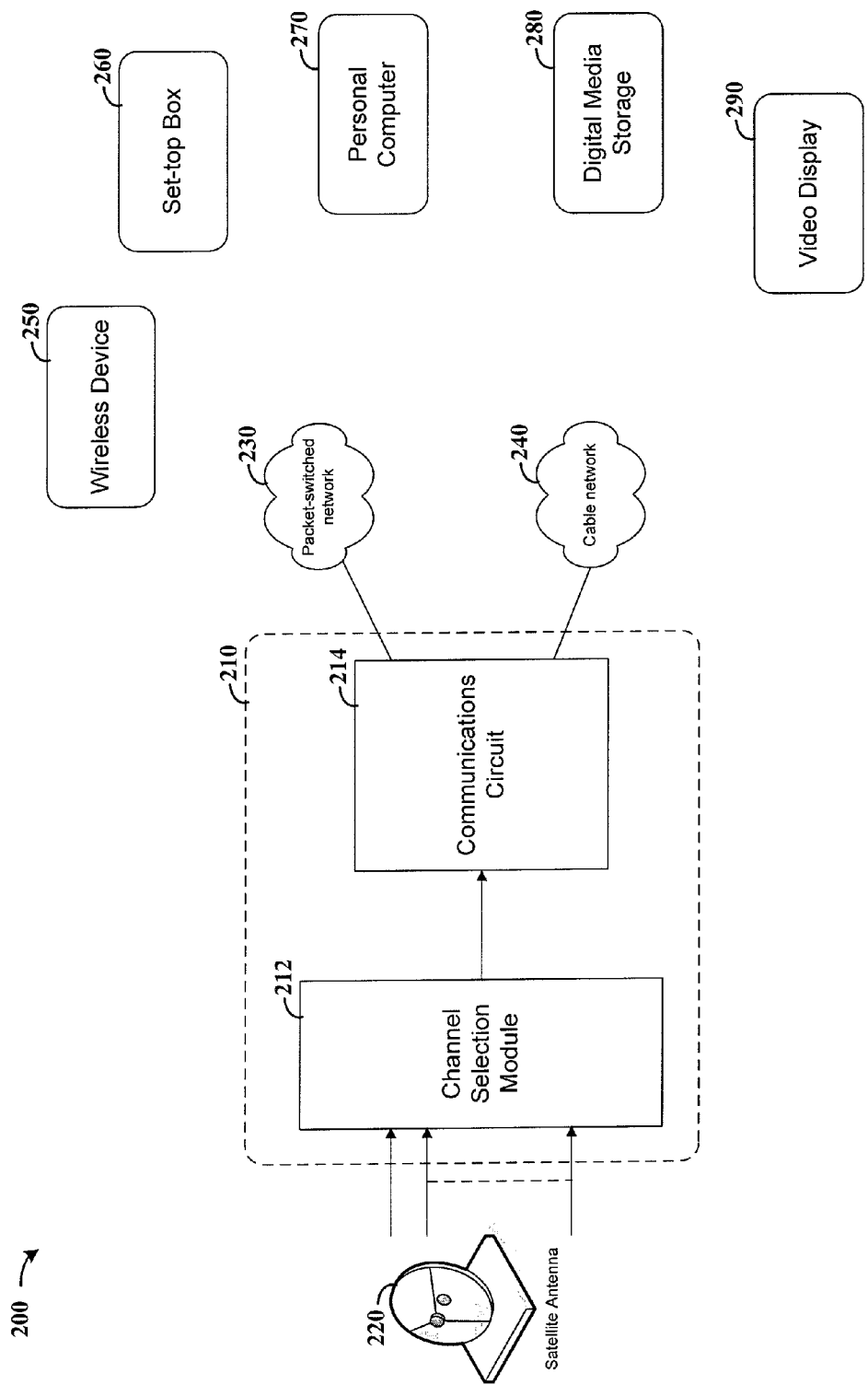
FIG. 2 shows a receiver hub for processing and communicating received media signals for presentation to one or more end devices, according to another example embodiment of the present invention.

FIG. 2 shows a media distribution system 200 including a receiver hub 210 for processing and communicating received media signals for presentation to one or more end devices, according to another example embodiment of the present invention. The hub 210 receives incoming signals from multiple satellites as received at an antenna 220. A channel selection module 212 receives and aggregates the signals, and selects a subset of channels from the aggregated signals in response to user-inputs identifying selected channels specified for respective end devices. Such end devices may include one or more of a variety of devices that use satellite media, with exemplary devices as shown including a wireless device 250, a set-top box 260, a personal computer 270, a digital media storage device 280 and a video display 290.

A communications circuit 214 is configured, for each channel in the subset of channels, to convert the channel into a device-specific data stream for communication to a specified end device on a local network over which the end devices communicate. By way of example, a packet-switched network 230 and a cabled network 240 are shown as respectively providing connections between the hub 210 and one or more of the end devices 250-290.

Accordingly, the communications circuit 214 converts the channel in a manner that permits the converted channel to be communicated over a particular one of the networks, and to arrive at the appropriate end device. For example, where a cable (e.g., RF cable) network is used, the communications circuit 214 converts the channel onto a frequency that is specific to the end device and within a predetermined frequency range reserved for channel communications, reserving a remaining portion of the frequency range for communications sent from the end devices on the cable network. In another example, where a packet-based network is used to transmit the converted channel using data protocol-based addressing, the communications circuit 214 arranges data in the channel into packets having a destination address within the packet. Where a cable network is used, a similar data protocol-based addressing approach can be used where the end device uses the cable for such packet-based communications (e.g., where an RF cable is used for LAN and/or Internet access).

The receiver hub 210, with corresponding channel selection module 212 and communications circuit 214, can be implemented using one or more of a variety of approaches. The following discussion regarding FIGS. 3-6 describes example embodiments involving the communication of received satellite signals, which may be implemented in connection with the hub 210 and/or one or both of the channel selection module 212 and the communications circuit 214.

Figure 3:
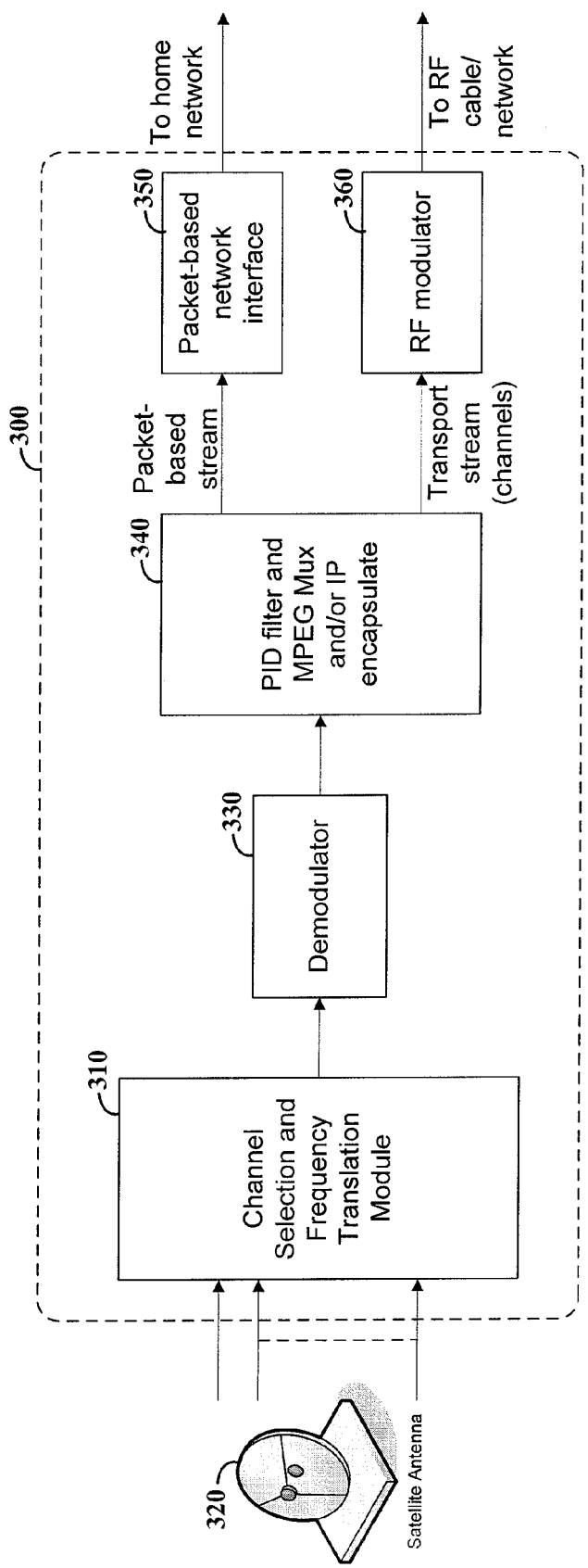
FIG. 3 shows a receiver hub for selecting and presenting satellite channels to end devices over one or more local networks, according to another example embodiment of the present invention.

FIG. 3 shows a receiver hub 300 for selecting and presenting satellite channels to end devices over one or more local networks, according to another example embodiment of the present invention. The hub 300 is coupled to receive incoming satellite streams from an antenna 320, with a channel selection and frequency translation module 310 used to select a subset of channels from within the satellite streams (e.g., from several Ka & Ku feeds). For example, a relatively small number of selected channels (e.g., 2-10) can be frequency translated into a limited range (e.g., 10-600 Mhz) for subsequent processing and communication. The frequency translation module 310 passes the subset of channels to a demodulator 330 that demodulates the channels into respective transport streams. A packet ID (PID) filter and MPEG multiplexer 340 filters the transport streams to select desired PIDs and to provide streams for communications to end devices, depending upon the type of network (and end device communications) to be used. Accordingly, one or both of a packet-based network interface 350 and a RF cable modulator/interface 360 (e.g., L band) are used, with the PID filter/MPEG multiplexer 340 respectively passing a packet-based (e.g., IP) stream or a transport stream to the interfaces for subsequent communications to an end device. Communications on the RF cable network use a restricted bandwidth range (e.g., 950-1100 Mhz) to permit other communications on the cable network in other frequency ranges. The number of channels passed on the cable network is thus set to maintain communications within the restricted bandwidth range.

Figure 4:
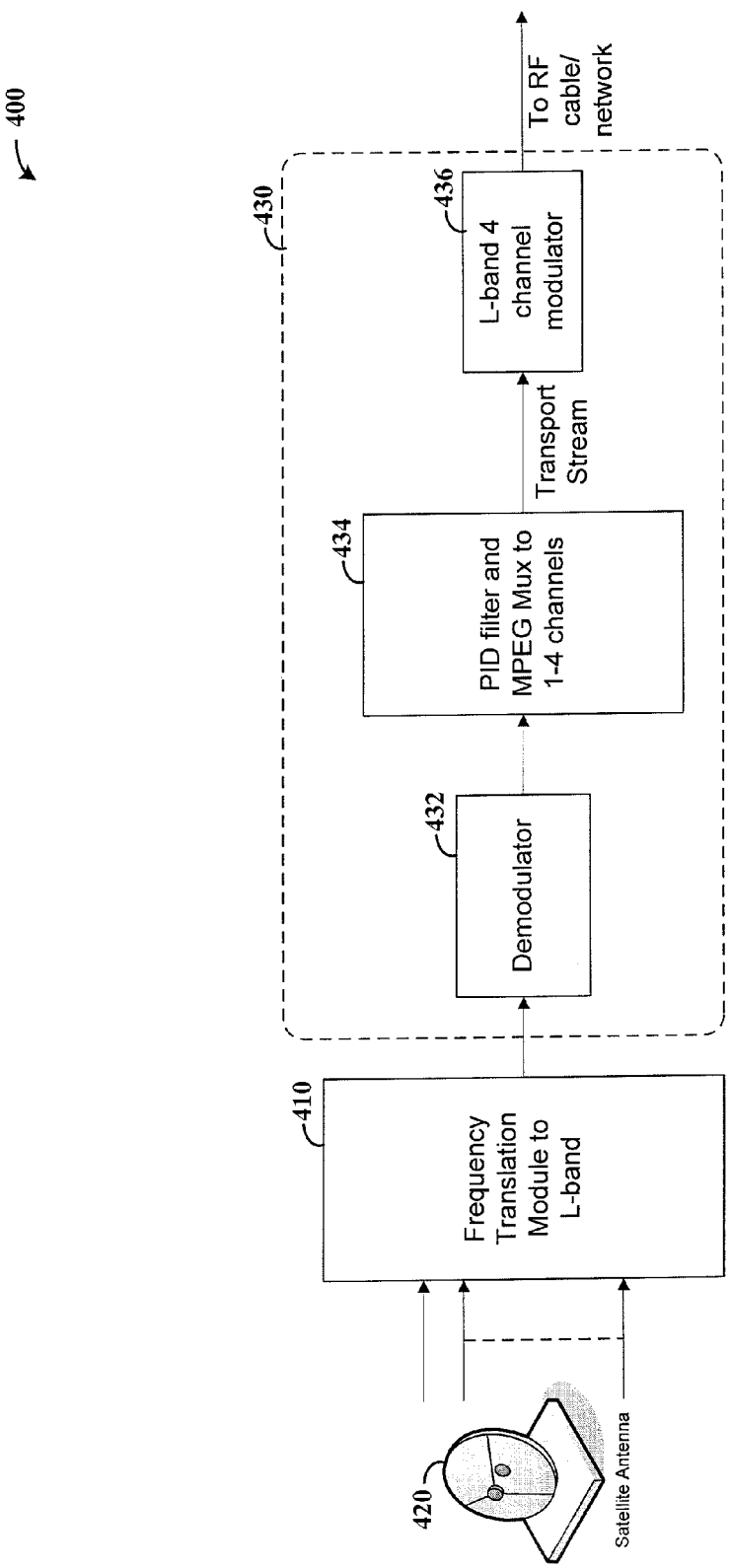
FIG. 4 shows a single-chip receiver circuit for selecting and presenting satellite channels to end devices using a predefined subset of a frequency range available for communications on a local network, according to another example embodiment of the present invention.

FIG. 4 shows a single-chip receiver circuit 400 for selecting and presenting satellite channels to end devices using a predefined subset of a frequency range available for communications on a local network, according to another example embodiment of the present invention. A frequency translation module 410 receives incoming broadcast satellite streams from an antenna 420, translates selected channels into an L band frequency range, and passes the translated channels to a communications chip 430 for configuring the channels for communication to a particular end device. The chip 430 includes a demodulator 432, PID filter and MPEG multiplexer 434, and an L band channel modulator 436 that operate, for example, using an approach as discussed above in connection with similar devices in FIG. 3. Here, the output is made to the L band of an existing cable network, using a restricted frequency range (e.g., the lower 150 Mhz), reserving a remaining portion (e.g., 1850 Mhz) for local network communications between devices and/or for communicating received satellite media between devices. For instance, where the frequency translation module translates incoming streams to the L band at 950-2150 Mhz, the PID filter/MPEG multiplexer 434 can pass those channels to the L band channel modulator 436, which in turn communicates the channels on a cable network using the 950-1100 Mhz range.

Figure 5:
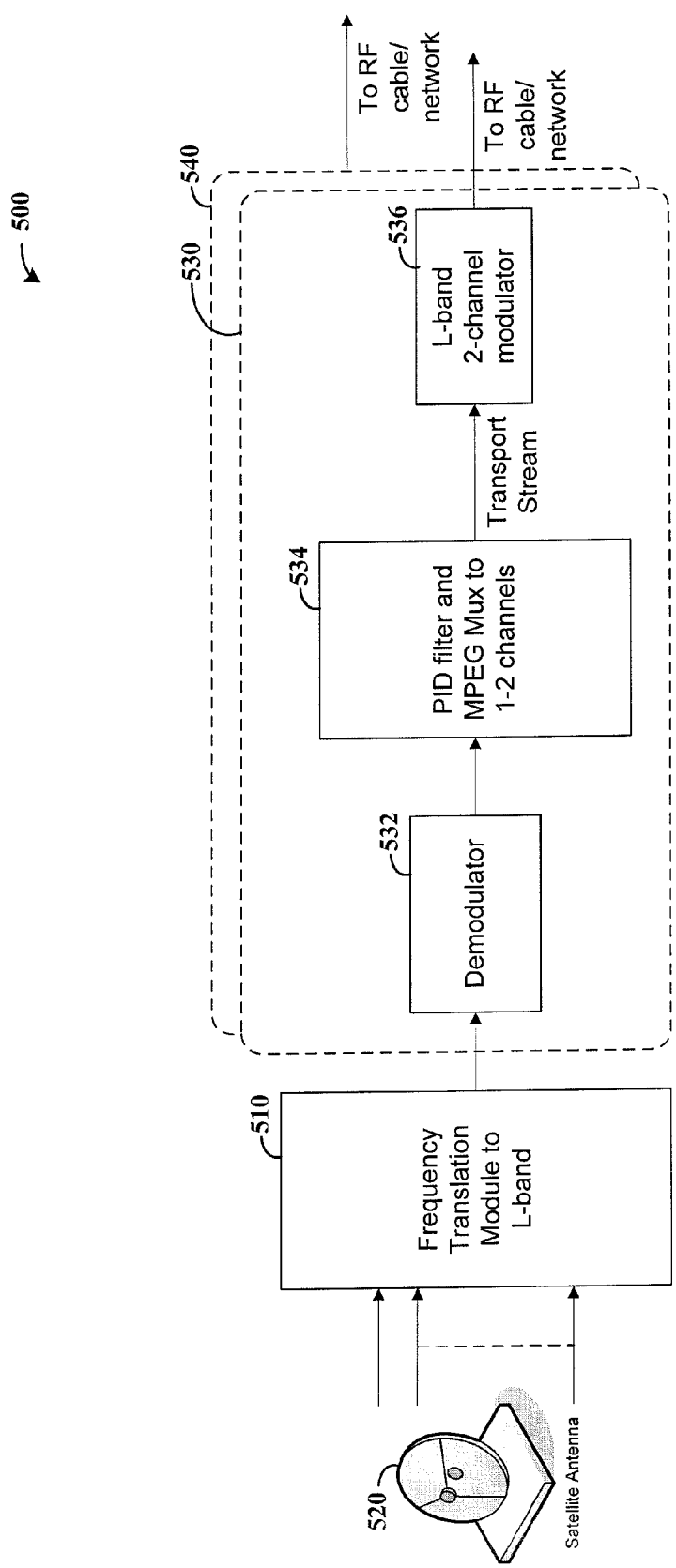
FIG. 5 shows a dual-chip receiver circuit for selecting and presenting satellite channels to end devices using a predefined subset of a frequency range available for communications on a local network, according to another example embodiment of the present invention.

FIG. 5 shows a dual-chip receiver circuit 500 for selecting and presenting satellite channels to end devices using a predefined subset of a frequency range available for communications on a local network, according to another example embodiment of the present invention. A frequency translation module 510 frequency translates signals from a satellite antenna 520 to the L band (e.g., 950-2150 Mhz) and provides the signals to each of two chips 530 and 540. The circuit 500 is similar to the circuit 400 shown in FIG. 4, instead using two chips to respectively process two channels for communication on a cable network. Operation of the circuit 500 is accordingly similar to that described above for the circuit 400, with chip 530 including a demodulator 532, PID filter/MPEG multiplexer 534 and L-band modulator 536, and chip 540 including similar circuits, respectively for providing two channels on a cable network. The output of the respective L band modulators occupy a restricted bandwidth (e.g. 950-1100 Mhz) of the cable network.

Figure 6:
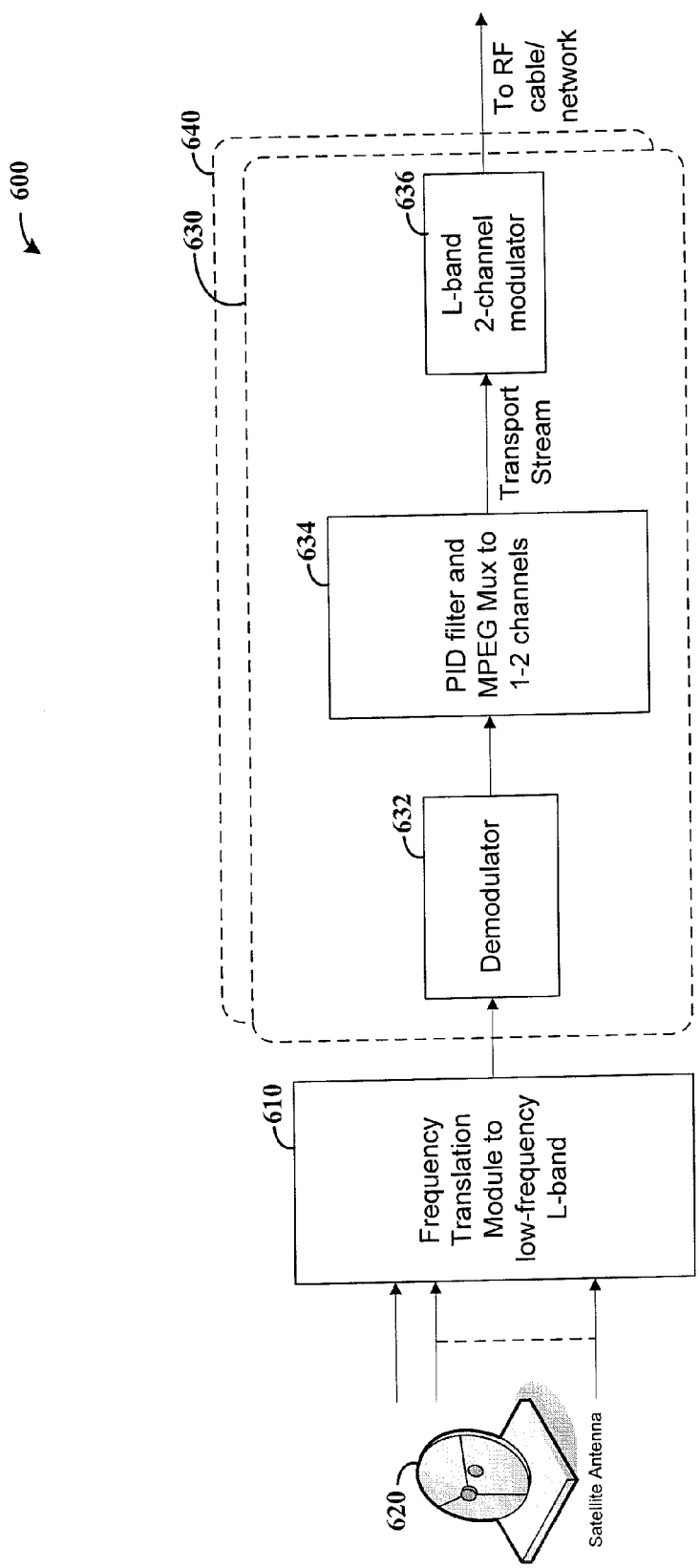
FIG. 6 shows a dual-chip receiver circuit for selecting and presenting satellite channels to end devices using a predefined subset of a frequency range available for communications on a local network, according to another example embodiment of the present invention.

FIG. 6 shows a dual-chip receiver circuit 600 for selecting and presenting satellite channels to end devices using a predefined subset of a frequency range available for communications on a local network, according to another example embodiment of the present invention. A frequency translation module 610 frequency translates signals from a satellite antenna 620 to a low frequency range in the L band (e.g., 10-600 Mhz) and provides the signals to each of two chips 630 and 640. The circuit 600 is similar to the circuit 500 shown in FIG. 5, instead using the lower range of the L band on frequency translation. Operation of the circuit 600 is accordingly similar to that described above for the circuit 500, with chip 630 including a demodulator 632, PID filter/MPEG multiplexer 634 and L-band modulator 636, and chip 640 including similar circuits, respectively for providing two channels on a cable network. As with the circuit 500, the circuit 600 occupies a restricted bandwidth on the cable network (e.g., 950-1000 Mhz). Where implemented with a home network (e.g., packet-based with IP protocol), a down-converter may be added to permit communications therewith.

Figure 7:
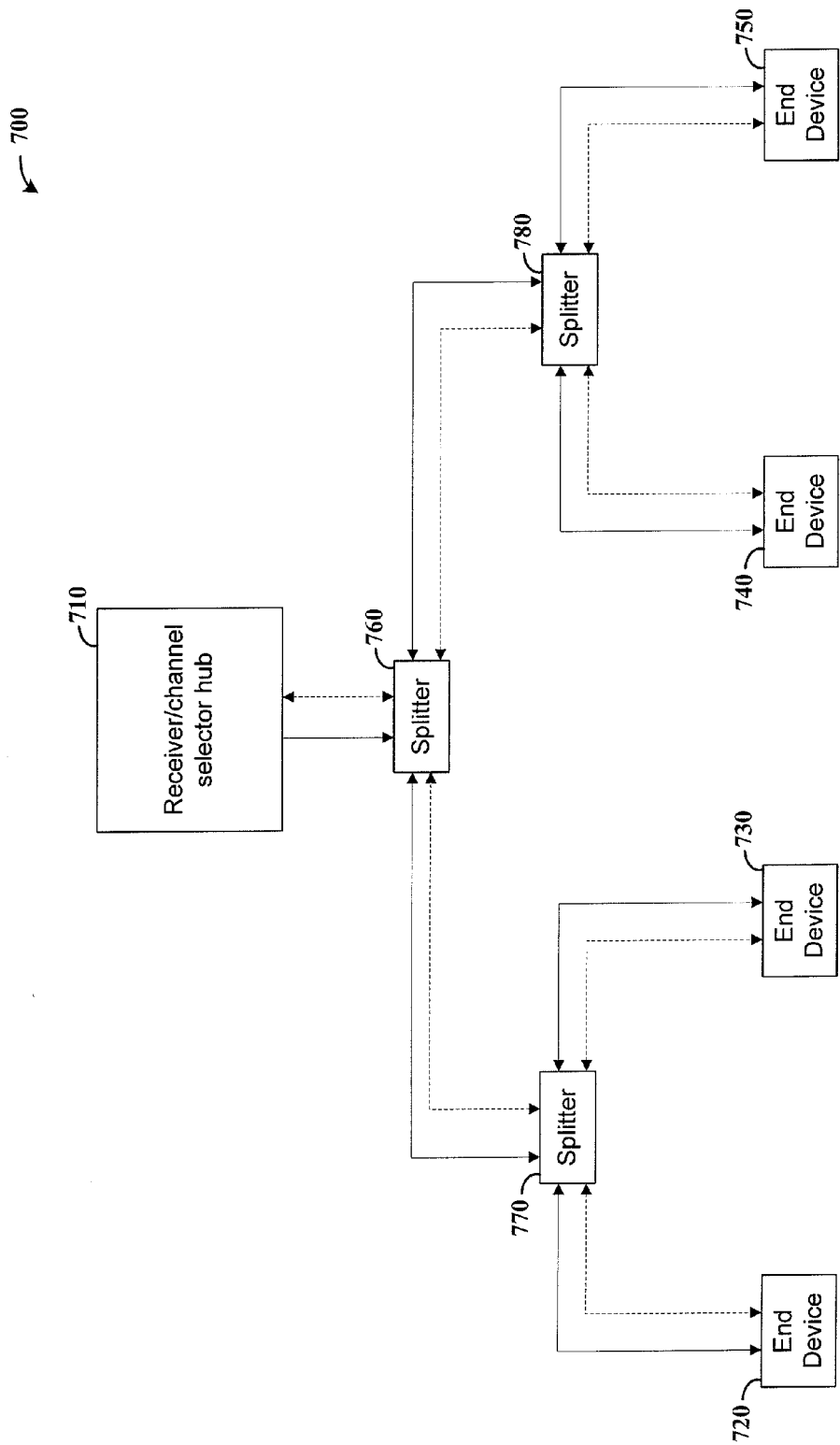
FIG. 7 shows a system for presenting received satellite channels to end devices and for communicating between the end devices over a local network, according to another example embodiment of the present invention.

FIG. 7 shows a system 700 for presenting received satellite channels to end devices and for communicating between the end devices over a local network, according to another example embodiment of the present invention. The system 700 includes a receiver/channel selector hub 710 that may implement one or more of the above hubs and/or receiver circuits as shown in FIGS. 1-7, to distribute selected channels in received satellite broadcast streams to end devices 720-750, with splitters 760-780 connecting the end devices and hub as a network. Solid-line arrows represent the communication of media content, such as a received channel in a satellite broadcast or stored content at one of the end devices. The dashed lines represent packet-based data network communications as carried out using a particular data protocol (e.g., IP protocol) to communicate one or more of controls, requests and media between networked devices. The end devices may be connected to a display for playback of video media, or may simply store data (e.g., as a centralized digital video recorder (DVR)) with received satellite channels directed to store received media on the DVR by inputs received at an end device or otherwise presented to the hub 710, such as using a personal computer on the network link.

Figure 8:
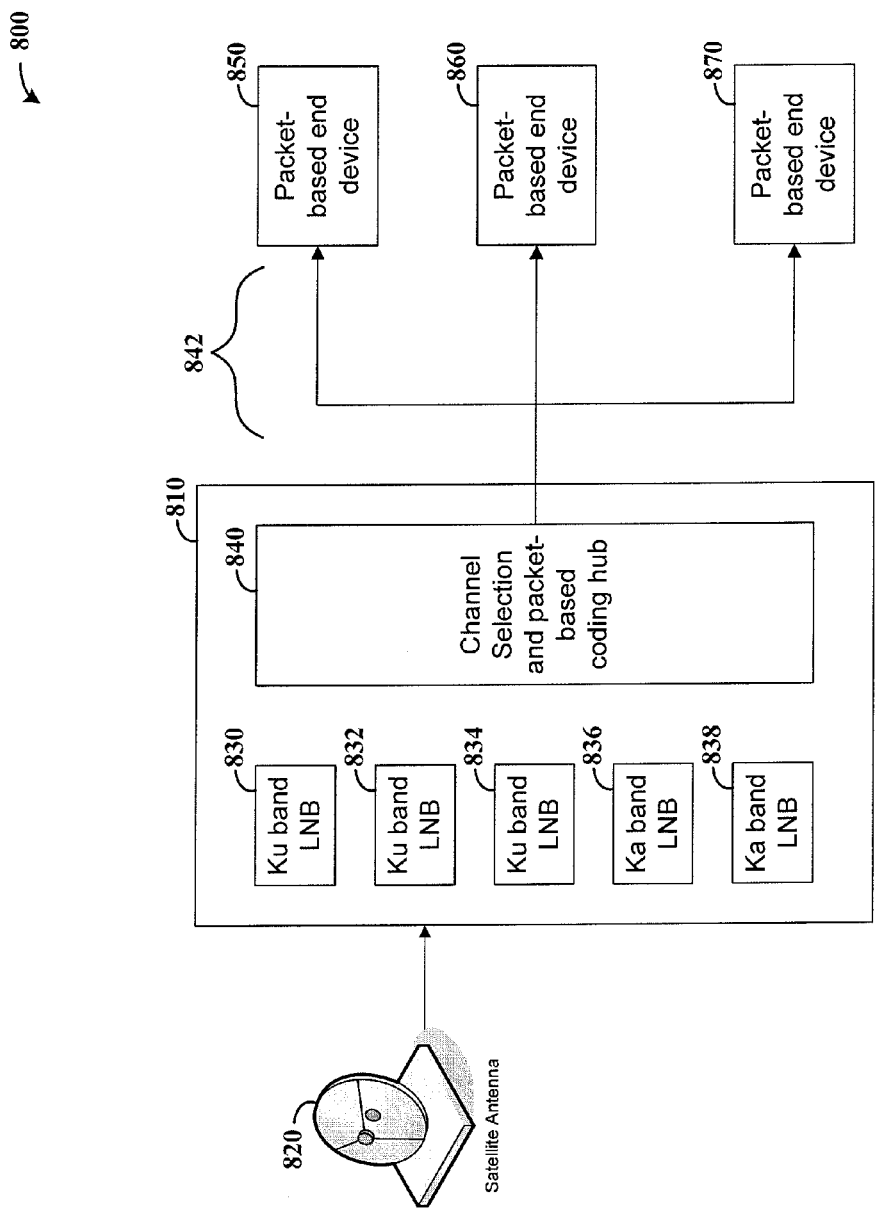
FIG. 8 shows a system for presenting received satellite channels to end devices and for communicating between the end devices over a local packet-based network, according to another example embodiment of the present invention.

FIG. 8 shows a system 800 for presenting received satellite channels to end devices and for communicating between the end devices over a local packet-based network, according to another example embodiment of the present invention. A front end circuit 810 receives multiple satellite inputs from multiple LNBs (low noise block converters) including Ku-band LNBs 830-834 and Ka-band LNBs 836-838. A channel selection and packet coding hub 840 receives signals from the LNBs and, in response to channel selections received from end devices over a packet-based network 842, converts selected channels into a packet-based format complying with a data communications protocol. The packetized channel streams are communicated on the packet-based network 842 to an appropriate one of the packet-based end devices 850-870, based upon a destination address of the devices.

Figure 9:
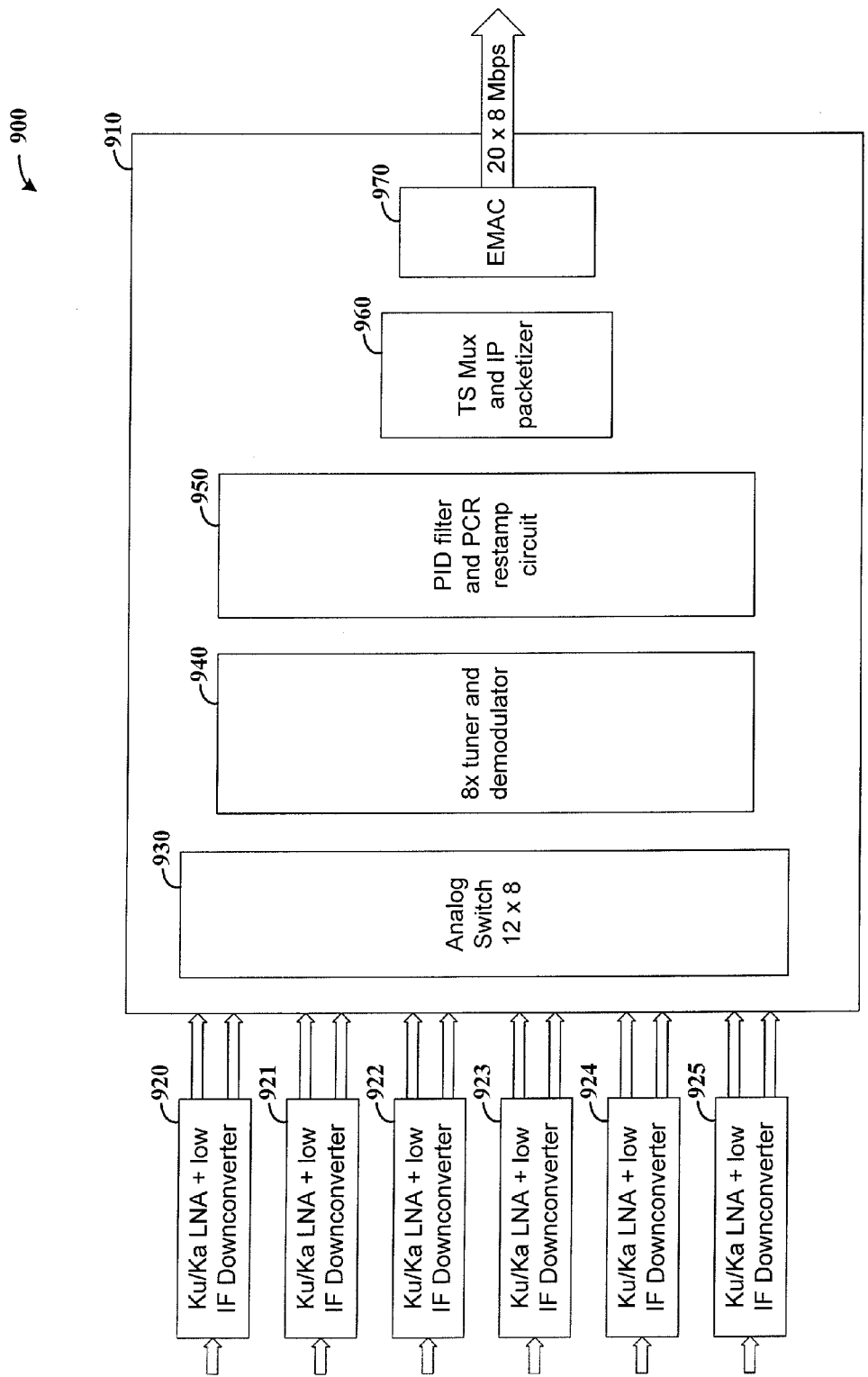
FIG. 9 shows a receiver hub for presenting received satellite channels to end devices and for communicating between the end devices over a local packet-based network, according to another example embodiment of the present invention.

FIG. 9 shows a front end hub 900 for presenting received satellite channels to end devices and for communicating between the end devices over a local packet-based network, according to another example embodiment of the present invention. The hub 900 may, for example, be implemented as the hub 840 shown in FIG. 8. A plurality of downconverters 920-925 receive satellite broadcast signals from LNBs on a satellite antenna, and respectively present the received signals as two 50-550 MHz signals (1000 MHz total) to a processing/communications chip 910. The chip 910 includes an analog switch 930, a tuner/demodulator 940, a PID filter/PCR restamp circuit 950 and a transport stream multiplexer/IP packetizer 960 The chip 910 also is shown including a EMAC circuit 970 (e.g., an Ethernet-based controller circuit), which can be implemented using different circuits to suit a particular type of outputs, depending upon the implementation. As with similar circuits above, the demodulator 940 demodulates incoming streams as received via the analog switch 930, passes the demodulated streams to the PID filter and PCR restamper 940, which selects packets based upon their packet ID and restamps the packets for communication. The transport stream multiplexer/IP packetizer 960 then configures the selected packets for communication on an IP network (i.e., with appropriate data protocol), and outputs the packets using an EMAC circuit 970 (e.g., at 20×8 Mbps, shown by way of example).

In addition to the above, the various processing approaches described herein can be implemented using a variety of devices and methods including general purpose processors implementing specialized software, digital signal processors, programmable logic arrays, discrete logic components and fully-programmable and semi-programmable circuits such as PLAs (programmable logic arrays). For example, algorithms can be executed on a microcomputer (a.k.a. microprocessor) in connection with certain embodiments, and as may be implemented as part of one or more of the devices shown in the figures and/or with one or more of the approaches described herein.

While the present invention has been described above, in the figures and in the claims that follow, various systems and approaches may be implemented in connection with and/or in addition to the example embodiments described above. For instance, embodiments described in reference to the figures may be implemented using different systems and approaches. Embodiments described without specific reference to the figures may be implemented with the figures. Other embodiments involve using different approaches in combination with those described, such as those involving the receipt and distribution of types of signals other than satellite signals (e.g., other wireless-originated signals). In this regard, those skilled in the art will recognize that many changes may be made thereto without departing from the spirit and scope of the present invention.

What is claimed is:

1. A satellite receiver hub comprising:
    a frequency translation module configured to select a subset of channels from a multitude of satellite broadcast channels in response to channel selection inputs received over a local network from end devices requesting the subset of channels, and to frequency translate the subset of channels to a portion of the L band in a restricted frequency range of 10-600 MHz;

a demodulator circuit configured to demodulate the frequency-translated channels and to generate transport streams for each channel, a packet identification (PID) filter and multiplexer circuit configured to convert the respective transport streams into a multiplexed output stream for use at respective end devices requesting the subset of channels and to filter the respective transport streams to select the desired PIDs and to provide the respective transport streams as the multiplexed output stream based on the type of end device communications to be utilized, and a network-specific interface circuit configured to receive the multiplexed output stream from the PID filter and multiplexer circuit, to modulate the multiplexed output stream onto the L band in a restricted frequency range of 950-1100 MHz, and to communicate the multiplexed output stream to the end devices on the local network over which the end devices communicate to one another.

2. The satellite receiver hub of claim 1, wherein PID filter and multiplexer circuit is configured to convert the respective transport streams into a multiplexed Internet protocol (IP) packet stream for use at respective packet-based end devices requesting the subset of channels; and the network-specific interface circuit is configured to receive the multiplexed IP packet stream from the PID filter and multiplexer circuit, and to communicate the multiplexed IP packet stream over a packet-based local area network.

3. A system for communicating broadcast satellite signals over a local packet-based network, the system comprising:

a plurality of end devices configured to communicate media content with one another over the local packet-based network using a packet-based communications protocol;

a satellite receiver hub configured to select a subset of channels from a multitude of satellite broadcast channels in response to channel selection inputs received over the local packet-based network from the plurality of end devices requesting the subset of channels, and frequency translate the subset of channels to a portion of the L band in a restricted frequency range of 10-600 MHz;

demodulate the frequency-translated channels and to generate transport streams for each channel, convert the respective transport streams into a multiplexed output stream for use at respective end devices requesting the subset of channels and filter the respective transport streams to select the desired packet identification and provide the respective transport streams as the multiplexed output stream based on the type of end device communications to be utilized, and receive the multiplexed output stream, modulate the multiplexed output stream onto the L band in a restricted frequency range of 950-1100 MHz, and communicate the multiplexed output stream to the plurality of end devices on the local packet-based network over which the plurality of end devices communicate to one another.

4. The system of claim 3, wherein the local packet-based network is an Internet protocol (IP) network, and the satellite receiver hub converts each channel for a particular end device into a packet-based data stream for communication on the IP network, with a destination address of the particular end device included with each packet in the packet-based data stream.

5. The system of claim 3, wherein the local packet-based network is an Internet protocol (IP) network operating on a cable network that supports both L band data communications and IP-based packet communications, and the satellite receiver hub converts each channel for a particular end device into a transport stream having a predefined frequency that is specific to the particular end device and that is within a restricted frequency available on the cable network, reserving a remaining frequency range on the cable network for IP-based packet communications.

6. The system of claim 3, wherein at least one of the plurality of end devices is configured to respond to requests for media content stored at the respective end device to another one of the plurality of end devices over the local packet-based network.

7. The system of claim 3, wherein at least one of the plurality of end devices is a digital media server configured to receive and store converted data streams received from the satellite receiver hub, and to deliver the stored converted data streams to other end devices in response to requests therefrom.

* * * * *